(12) United States Patent
Labarre et al.

(10) Patent No.: US 10,382,370 B1
(45) Date of Patent: Aug. 13, 2019

(54) AUTOMATED SERVICE AGENTS

(71) Applicant: Amazon Technologies, Inc., Seattle, WA (US)

(72) Inventors: Thibaut Labarre, Seattle, WA (US); Hung Chiu Phillip Keung, Seattle, WA (US); Yichao Lu, Seattle, WA (US); Ranjit Parvathaneni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/234,200

(22) Filed: Aug. 11, 2016

(51) Int. Cl.
*H04L 12/58* (2006.01)

(52) U.S. Cl.
CPC .............. *H04L 51/04* (2013.01); *H04L 51/02* (2013.01); *H04L 51/14* (2013.01)

(58) Field of Classification Search
CPC .......... H04L 51/02; H04L 51/04; H04L 51/14
See application file for complete search history.

(56) References Cited

U.S. PATENT DOCUMENTS

| | | | | |
|---|---|---|---|---|
| 8,792,631 | B2* | 7/2014 | Addair | H04M 3/5233 379/265.01 |
| 9,699,207 | B2* | 7/2017 | Chapman | G06F 21/6245 |
| 9,800,727 | B1* | 10/2017 | Chakrabarty | H04M 3/5232 |
| 10,200,334 | B1 | 2/2019 | Cordell et al. | |
| 2002/0119793 | A1 | 8/2002 | Hronek et al. | |
| 2005/0080930 | A1* | 4/2005 | Joseph | G06F 9/5038 709/248 |
| 2006/0080130 | A1 | 4/2006 | Choksi | |
| 2006/0248474 | A1 | 11/2006 | Kimotsuki | |
| 2008/0049929 | A1 | 2/2008 | Miloslavsky et al. | |
| 2010/0142698 | A1* | 6/2010 | Spottiswoode | H04M 3/5232 379/265.11 |
| 2011/0243310 | A1 | 10/2011 | Franklin-Barr et al. | |
| 2012/0271643 | A1 | 10/2012 | Da et al. | |
| 2012/0309436 | A1 | 12/2012 | Lan et al. | |

(Continued)

OTHER PUBLICATIONS

Non-Final Office Action dated Jul. 27, 2016; U.S. Appl. No. 14/974,501.

(Continued)

*Primary Examiner* — Uzma Alam
(74) *Attorney, Agent, or Firm* — Thomas Horstemeyer, LLP (57) ABSTRACT

Disclosed are various embodiments to deploy automated service agents, which can be implemented with an application executed on a computing device. The application can cause the computing device to process a transcript to identify an intended action of a service agent, wherein the transcript comprises a first set of text generated by the service agent and a second set of text generated by another party. The application can also cause the computing device, in response to an identification of the intended action from the transcript, to process the transcript to extract a minimum set of information required to create a workflow item that corresponds to the intended action. Moreover, the application can cause the computing device to send a request to a workflow management system to create the workflow item that corresponds to the intended action, wherein the request comprises an identifier for the intended action and the acquired information.

19 Claims, 6 Drawing Sheets

(56) References Cited

U.S. PATENT DOCUMENTS

| | | | |
|---|---|---|---|
| 2014/0044243 A1 | 2/2014 | Monegan et al. | |
| 2014/0067375 A1* | 3/2014 | Wooters | G06F 17/28 704/9 |
| 2014/0164302 A1 | 6/2014 | Di Fabbrizio et al. | |
| 2014/0222503 A1* | 8/2014 | Vijayaraghavan | G06Q 30/0201 705/7.29 |
| 2014/0365594 A1* | 12/2014 | Miner | H04L 51/14 709/206 |
| 2015/0006632 A1* | 1/2015 | Tomkins | H04L 51/20 709/204 |
| 2015/0073868 A1* | 3/2015 | Garman | G06Q 10/02 705/7.31 |
| 2015/0348173 A1* | 12/2015 | Gillen | G06Q 30/0635 705/26.81 |
| 2016/0044083 A1* | 2/2016 | Galloway | H04L 67/02 709/217 |
| 2016/0055563 A1 | 2/2016 | Grandhi | |
| 2016/0063993 A1 | 3/2016 | Dolan et al. | |
| 2016/0078512 A1 | 3/2016 | Yopp et al. | |
| 2016/0163311 A1 | 6/2016 | Crook et al. | |
| 2016/0173424 A1* | 6/2016 | Fuhrmann | H04L 51/28 709/206 |
| 2016/0173627 A1* | 6/2016 | Herling | G06F 3/04883 709/205 |
| 2016/0196491 A1 | 7/2016 | Chandrasekaran et al. | |
| 2016/0234245 A1* | 8/2016 | Chapman | G06F 21/6245 |
| 2016/0260029 A1 | 9/2016 | Gelfenbeyn et al. | |
| 2016/0316059 A1 | 10/2016 | Nuta et al. | |
| 2016/0322044 A1* | 11/2016 | Jung | G06F 3/017 |
| 2016/0379129 A1* | 12/2016 | Assem Aly Salama | G06Q 30/0282 706/52 |
| 2017/0006161 A9* | 1/2017 | Riahi | G06Q 30/02 |
| 2017/0032783 A1* | 2/2017 | Lord | G10L 15/22 |
| 2017/0132019 A1* | 5/2017 | Karashchuk | H04W 4/12 |
| 2017/0139802 A1* | 5/2017 | Hajiyev | G06F 11/3476 |
| 2017/0195495 A1* | 7/2017 | Deora | H04M 3/42042 |
| 2017/0228771 A1* | 8/2017 | Singh | G06Q 30/0246 |
| 2018/0083894 A1 | 3/2018 | Fung et al. | |
| 2018/0090135 A1 | 3/2018 | Schlesinger et al. | |

OTHER PUBLICATIONS

U.S. Appl. No. 14/974,501, filed Dec. 18, 2015, Final Office Action dated Mar. 17, 2017.

U.S. Appl. No. 14/974,501, filed Dec. 18, 2015, Response to Non-Final Office Action dated Jul. 27, 2016.

U.S. Appl. No. 14/974,501, filed Dec. 18, 2015, Response to Final Office Action dated Mar. 17, 2017.

U.S. Appl. No. 14/974,501, filed Dec. 18, 2015, Advisory Office Action dated May 15, 2017.

U.S. Appl. No. 14/974,501, filed Dec. 18, 2015, Non-Final Office Action dated Jul. 7, 2017.

U.S. Appl. No. 14/974,501, filed Dec. 18, 2015, Response to Non-Final Office Action dated Jul. 7, 2017.

U.S. Appl. No. 15/340,022, filed Nov. 1, 2016, Non-Final Office Action dated Feb. 8, 2018.

U.S. Appl. No. 14/974,501, filed Dec. 18, 2015, Notice of Allowance dated Mar. 22, 2018.

U.S. Appl. No. 15/340,022, filed Nov. 1, 2016, Final Office Action dated Jun. 29, 2018.

U.S. Appl. No. 15/340,022, filed Nov. 1, 2016, Response to Non-Final Office Action dated Feb. 8, 2018.

U.S. Appl. No. 15/336,934, filed Oct. 28, 2016, Non-Final Office Action dated Jul. 12, 2018.

U.S. Appl. No. 15/336,934, filed Oct. 28, 2016, Final Office Action dated Jan. 24, 2019.

U.S. Appl. No. 15/340,022, filed Nov. 1, 2016, Non-Final Office Action dated Mar. 7, 2019.

* cited by examiner

AUTOMATED SERVICE AGENTS

BACKGROUND

Service agents often interact with users to resolve user problems or issues. For example, a user may communicate with a service agent in order to change or cancel an order placed through an electronic commerce application. As another example, a user may communicate with a service agent in order to receive technical support. However, maintaining large number of service agents can be expensive. Moreover, the level of expertise among individual service agents can vary, as can the customer service skills of individual service agents.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Users of an application or service can occasionally have problems with the application or service. For example, a user ordering an item from an electronic merchant may wish to make changes to the order after it has been placed, dispute a payment or a charge, cancel an order, return an item, or perform some other action related to the order. As another example, a user of an application may require technical support. For example, a user of a web application, a software-as-a-service ("SaaS") application, or other application may need assistance using the application, resolving a problem with the application, changing a setting (e.g., a username or password), or otherwise require assistance in using the application.

Users may seek help to resolve their problems. For example, a user may contact a customer service department of an electronic merchant so that they can make changes to the order after it has been placed, dispute a payment or a charge, cancel an order, return an item, or perform some other action related to the order. As another example, a user may contact a technical support service offered by an application vendor in order to resolve a problem with the application, change a setting (e.g., a username or password), or address some other issue.

Certain requests for assistance are often made more frequently than others. For example, requests to change usernames or passwords may occur more frequently than requests for assistance in navigating a menu. As another example, requests for the status of an order may occur more frequently than requests to change an order. Likewise, requests for a refund or replacement for an item ordered may occur more frequently than other requests.

To address requests for assistance, a vendor may provide a number of tools to users to allow the users to resolve the issue on their own. For example, an electronic merchant may provide a network page or application that allows users to check the status of their order. Likewise, a network site can provide a user with a password reset tool to allow a user to access a network page if the user has forgotten his or her password. Vendors may provide other tools to service other common user requests for assistance.

However, the vendor tools may not necessarily solve all problems or be useful to all users. For example, some problems that a user may experience may not have a corresponding tool with which the user can address an issue. As another example, the user may be unable to make use of the available vendor tools (e.g., due to technical issues). Further, some users may prefer to interact with a customer service agent instead of using a vendor tool to solve the user's issue. For example, some users may prefer the experience of interacting with another person.

Unfortunately, hiring a large number of customer service agents to provide support to users is expensive due to the cost of labor. A vendor that could automate some of the interactions between a customer service agent and a user would therefore be able to save on labor costs by either hiring fewer customer service agents or using the same number of customer service agents to service a larger number of users. Accordingly, the various embodiments of the present disclosure involve applications, known as "chat bots," that automate conversations with users seeking assistance addressing common issues. In the following discussion, a general description of the system and its components is provided, followed by a discussion of the operation of the same.

Figure 1:
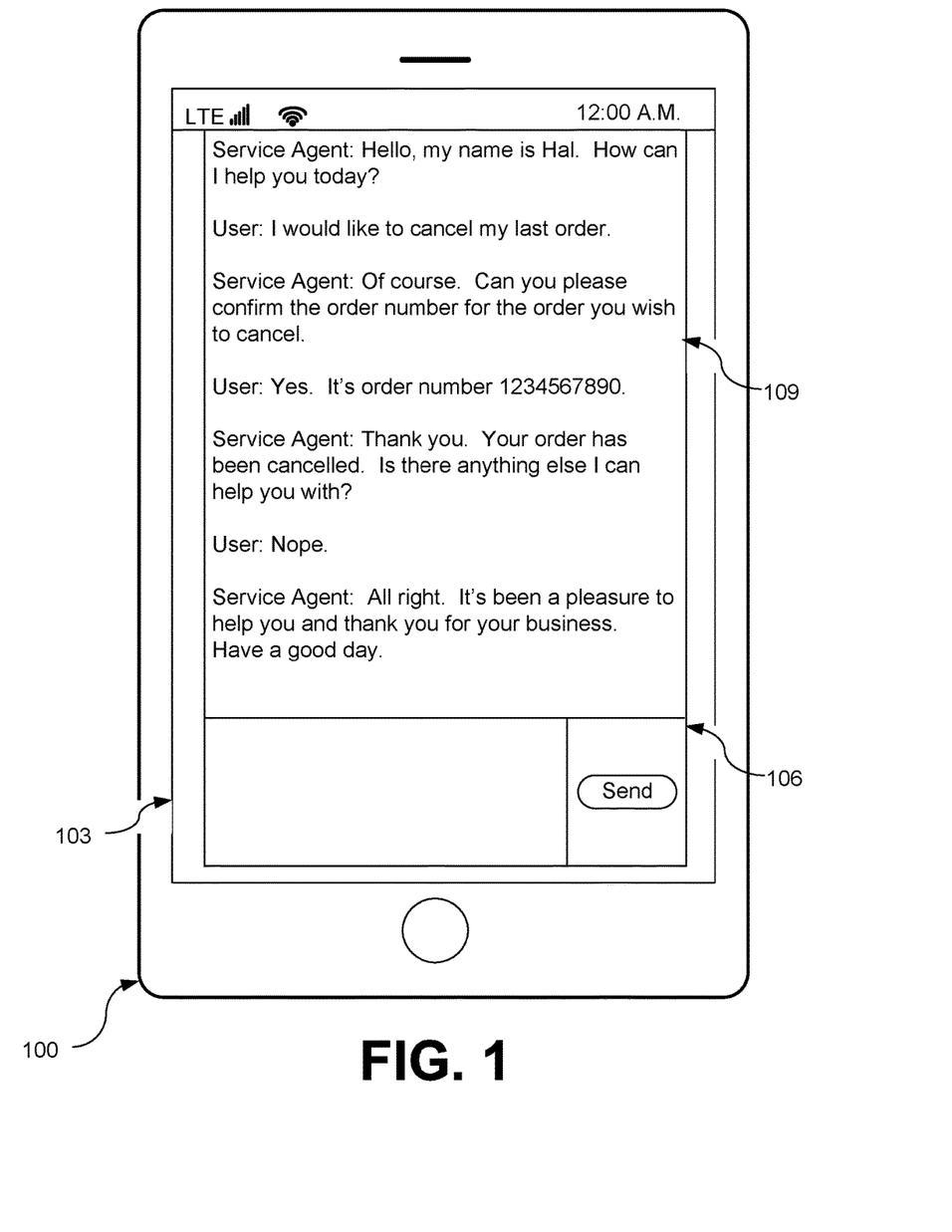
FIG. 1 is an example of a user's experience on a client device interacting with various implementations of the present disclosure.

With reference to FIG. 1, shown is a client device 100. The client device 100 can be embodied in the form of a desktop computer, a laptop computer, mobile computing devices (e.g., smartphones, tablet computer systems, personal digital assistants, cellular telephones, music players, etc.), wearable computing devices (e.g., smartwatches, smart glasses, head-mounted displays, etc.), set-top boxes, game consoles, electronic book readers, or other devices with like capability. The client device 100 may include a display 103. The display 103 can include, for example, one or more devices such as liquid crystal displays (LCDs), gas plasma-based flat panel displays, organic light emitting diode (OLED) displays, electrophoretic ink (E-ink) displays, LCD projectors, or other types of display devices.

However, in some instances, the client device 100 may be configured to operate in a "headless" mode without a display. In these instances, the client device 100 can be operated using voice commands, hand gestures, or other interface. For example, voice commands can be received with a microphone and processed using a speech-to-text processor or application. Likewise, hand gestures can be recognized with a camera and processed using various approaches.

The client device 100 can be used to interact with various service agents. The service agents can include human operators or automated service agents (e.g., in the form of chat bots or similar applications). For example, a user interface 106 can be rendered or otherwise presented to a user. This can allow a user to electronically communicate with a service agent. For example, a user can use a message program to communicate with a service agent, in which case a transcript 109 can be rendered within the user interface 106. However, a user may also use the client device 100 to verbally communicate with the service agent. For example, the user may make a phone call or use a voice-over-internet-protocol ("VoIP") application to talk to the service agent.

In the depicted example, as a user communicates with the service agent, a transcript 109 of the conversation is recorded. In embodiments that use automated service agents (e.g., chat bots), the responses of the service agent can be automatically generated through the use of a recurrent neural network trained on a plurality of transcripts 109. A separate application can be executed to review the transcript 109 of the conversation between the user and the service agent in order to take an appropriate action based on a response provided by the service agent, as further described herein.

Figure 2:
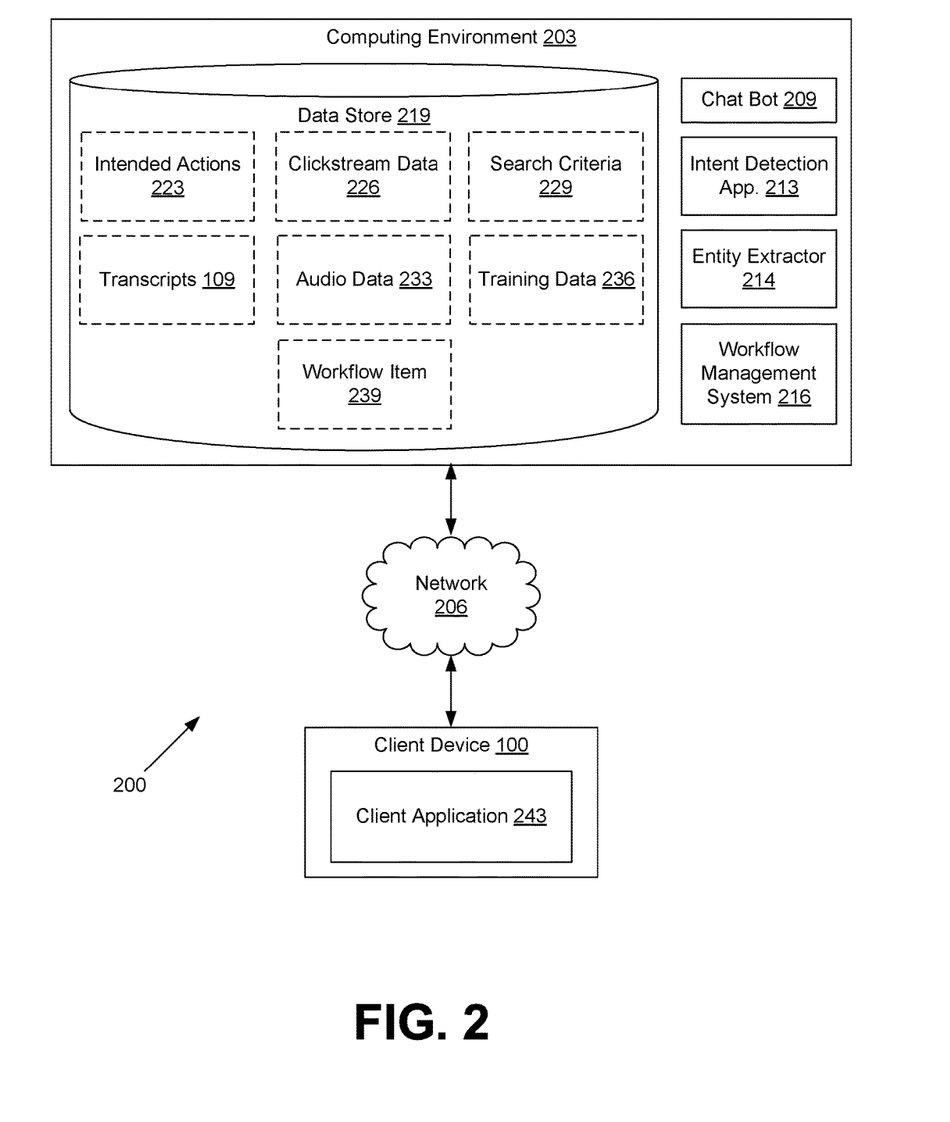
FIG. 2 is a drawing of a networked environment according to various embodiments of the present disclosure.

Moving on to FIG. 2, shown is a networked environment 200 according to various embodiments. The networked environment 200 includes a computing environment 203 and a client device 100, which are in data communication with each other via a network 206. The network 206 can include, for example, the Internet, intranets, extranets, wide area networks (WANs), local area networks (LANs), and various other network topologies. Accordingly, the network 206 can be configured using a wired network, a wireless network, or any combination of two or more such networks. For example, such networks can include satellite networks, cable networks, Ethernet networks, Wi-Fi networks, and other types of networks.

The computing environment 203 can include, for example, a server computer or any other system providing computing capability. Alternatively, the computing environment 203 may employ a plurality of computing devices that may be arranged in one or more server banks, computer banks, or other arrangements. Such computing devices may be located in a single installation or may be distributed among many different geographical locations. For example, the computing environment 203 may include a plurality of computing devices that together may include a hosted computing resource, a grid computing resource, or any other distributed computing arrangement. In some cases, the computing environment 203 may correspond to an elastic computing resource where the allotted capacity of processing, network, storage, or other computing-related resources varies over time.

Various applications or other functionality may be executed in the computing environment 203 according to various embodiments. The components executed on the computing environment 203, for example, include a chat bot 209, an intent detection application 213, an optional entity extractor 214, and a workflow management system 216. Other applications, services, processes, systems, engines, or functionality not discussed in detail herein may also be executed in the computing environment 203.

Also, various data is stored in a data store 219 that is accessible to the computing environment 203. The data store 219 may be representative of a plurality of data stores 219. Further, the data stored in the data store 219 is associated with the operation of the various applications or functional entities described below. The data stored in the data store 219 includes, for example, intended actions 223, clickstream data 226, search criteria 229, transcripts 109, audio data 233, training data 236, workflow items 239, and potentially other data.

The chat bot 209 is executed to communicate with a user of a client device 100 through various media. For example, the chat bot 209 can be configured to provide text responses to queries, requests, or instructions provided by a user (e.g., via electronic mail, a social media forum, a chat application, or similar messaging application). An example of such a configuration is illustrated in FIG. 1, which is discussed above. In another example, the chat bot 209 can include a voice synthesizer component that would allow the chat bot 209 to participate in a voice communication session with a user. For instance, the chat bot 209 could include a text-to-speech and a speech-to-text component in order to identify user requests or instructions and convert an appropriate response to a voice response.

In order to generate appropriate responses, the chat bot 209 can be configured to make use of recurrent neural network to select an appropriate response when provided with a given input (e.g., a request, query, statement, or instruction from a user). The recurrent neural network can be provided with a plurality of transcripts 109 to train the recurrent neural network to respond in a particular manner to a specific statement or request from a user. However, other machine learning approaches can be used in other embodiments.

The intent detection application 213 is executed to analyze transcripts 109 of conversations between a service agent and one or more users to identify intended actions 223. For example, where the service agent includes a chat bot 209, the intent detection application 213 can be executed to analyze a transcript 109 of a conversation between the chat bot 209 and a user. In some instances, the transcript 109 can correspond to a previous conversation between the chat bot 209 and a user, while in other instances, the transcript 109 can correspond to a current or on-going conversation between the chat bot 209 and the user. However, the intent detection application 213 can similarly be used to analyze transcripts 109 between a human service agent and a user. The intent detection application 213 can be further configured to create a workflow item 239 corresponding to the identified intended action 223 or send a request to the workflow management system 216 to create the workflow item 239 corresponding to the identified intended action 223.

The entity extractor 214 can be executed to extract information from a transcript 109 that the intent detection application 213 requires to create the workflow item 239 that corresponds to the identified intended action 223. For example, if the intended action 223 corresponds to issuing a refund for an item, the entity extractor 214 could be executed to identify the order number that included the item to be refunded, the item for which a refund is to be issued, and the amount to be refunded. For other intended actions 223, the entity extractor 214 could extract different types of information from the transcript 109. In some implementations, the functionality of the entity extractor 214 can be merged into the intent detection application 213. In these implementations, the entity extractor 214 could include a library or module included in the intent detection application 213 instead of an independent application.

The workflow management system 216 is executed to provide an infrastructure for the set-up, performance, and monitoring of a defined sequence of tasks, arranged as a workflow. The workflow can be represented as a workflow item 239. Accordingly, the workflow management system 216 can be configured to route specific tasks in a workflow to the appropriate person to perform the task, manage and resolve dependencies for individual tasks within a given workflow, assign priorities to individual workflows or tasks within a workflow, and other functions to facilitate completion of a given workflow.

The transcripts 109 represent individual transcripts of conversations that occur between one or more service agents, such as a chat bot 209, and one or more users. Typically, the transcripts 109 will be stored in text form. This allows for transcripts 109 of written conversations between service agents and users (e.g., via email, social media, or messaging application) to be directly stored. Voice conversations (e.g., phone calls) can be converted to a text transcript using a speech-to-text converter or similar application.

The intended actions 223 represent actions to be performed by the service agent or other agent to address or resolve a user's issue. Any number of intended actions 223 could apply for any individual embodiment of the present disclosure. For example, an electronic storefront can have intended actions 223 such as cancelling a customer's order, modifying or changing a customer's order, issuing a refund, processing a return, updating a customer's information (e.g., address, billing information, etc.), or similar actions. As another example, a network site (e.g., a web site) could have intended actions 223 such as resetting a user's password, changing a user's username, updating a user's information, or similar actions. A technical support provider could have intended actions 223 that correspond to solutions for common user problems (e.g., reboot a computer, restart an application, etc.).

Accordingly, each intended action 223 can specify both the type of action to be performed and the information that should be collected for the action to be performed. For example, if the intended action 223 is for changing an order, the intended action 223 may specify that the order number or similar identifier is required, as well as the nature of the change to be made to the order (e.g., change to shipping address, change to items in order, change of delivery date, etc.). Depending on the nature of the change to be made to the order, the intended action 223 may specify additional information that should be obtained from the transcript (e.g., identifier of item to be removed from or added to an order, new delivery address of order, etc.). As another example, if the intended action 223 is to issue a refund-on-return for an item, the intended action 223 may specify that an order identifier, an item identifier, a customer account, and a refund method (e.g. store credit/gift card, refund to credit card, etc.) be collected. Other intended actions 223 may specify other types of information to be collected in order for the intended action 223 to be performed.

The clickstream data 226 represents a recording or recordings of parts of a display that a service agent can interact with while using a software application. For example, the clickstream data 226 could record particular buttons that a service agent clicks on, keystrokes entered by a service agent, and similar data. This data could be collected as a service agent takes a particular action to resolve a customer issue (e.g., cancel an order, modify an order, issue a refund, process a return, reset or change a user's password, etc.) using a customer service application or portal.

The clickstream data 226 can also be associated with a transcript 109. This association allows for a particular conversation to be associated with an action performed by a service agent. This association can be used to link an intended action 223 to a transcript 109 based on the clickstream data 226. Accordingly, the intent detection application 213 can use the link to determine that other transcripts 109 that contain similar language should trigger the same intended action 223.

The search criteria 229 include various pattern matching expressions for matching an intended action 223 to a transcript 109 or portion of the transcript 109. For example, a search criteria 229 could include a regular expression that represents a sequence of characters that defines a search pattern. The search pattern can be used in pattern matching with strings. Each search criteria 229, such as a regular expression, can be linked to an intended action 223. If a string in a transcript 109 matches a search criteria 229, then the intent detection application 213 can determine that the linked intended action 223 should be triggered.

The audio data 233 represents recordings of voice conversations between a user and a service agent, such as the chat bot 209 or a customer service representative. These voice conversations could correspond to phone calls between a user and a service agent. The audio data 233 for a conversation can be converted to a transcript 109 using a speech-to-text-converter or similar utility or application.

The training data 236 represents a plurality of transcripts 109 used to train the chat bot 209 to communicate with users. For example, a recurrent neural network can be trained with the training data 236 in order for the chat bot 209 to generate appropriate responses to customer requests, queries, statements, etc. Individual transcripts 109 can be selected for inclusion in the training data 236 based on various criteria. For example, transcripts 109 can be selected because they represent a conversation with a user that resulted in a particular intended action 223, because they represent a conversation with a user that resulted in a satisfactory resolution for the user's issue, or for various other reasons.

A workflow item 239 represents a task to be performed using the workflow management system 216. Accordingly, a workflow item 239 can include information such as the task to be performed, the responsible party for completing the task, as well as any necessary subtasks to be completed in order to perform the task. The workflow item 239 may also correspond to an intended action 223. For example, when the intent detection application 213 determines an intended action 223 of a service agent based on a transcript 109, such as an intended action 223 to cancel an order, the intent detection application 213 can cause a workflow item 239 for cancellation of the order to be created and processed by the workflow management system 216.

The client device 100 may be configured to execute various applications such as a client application 243 or other applications. The client application 243 may be executed in a client device 100, for example, to access network content served up by the computing environment 203 or other servers, thereby rendering a user interface 106 (FIG. 1) on the display 103 (FIG. 1). To this end, the client application 243 can include, for example, a browser, a dedicated application, or other application. The user interface 106 can include a network page, an application screen, or other mechanism for interacting with or manipulating the client application 243 executing on the client device 100. The client device 100 may be configured to execute applications beyond the client application 243, such as email applications, social networking applications, word processors, spreadsheets, messaging applications, chat applications, or other applications.

Next, a general description of the operation of the various components of the networked environment 200 is provided. To begin, the chat bot 209 is trained to communicate with users. To train the chat bot 209, a set of training data 236 is initially provided to a recurrent neural network or similar machine learning system employed by the chat box 209. The chat bot 209 can then identify appropriate responses to provide to specific input provided by a user (e.g., respond with shipment information when a user requests an update on a shipment). The chat bot 209 then waits to be contacted by a user.

At some point, a user contacts the chat bot 209. For example, the user may interact with the chat bot 209 using a messaging application, an email application, a chat application, or other communications application on the client device 100. As another example, the user may use a telephone to call a number, where the call is routed to the chat bot 209. In this example, a speech-to-text application may be used to convert a user's verbal statements or questions into text that can be processed by the chat bot 209. Likewise, the chat bot 209 may supply responses to a text-to-speech application to convert text responses into a verbal response that can be supplied to the user via the telephone.

After contacting the chat bot 209, the user may have a conversation with the chat bot 209 to discuss and attempt to address or resolve an issue of the user. However, the chat bot 209 itself does not undertake any specific action to resolve the issue of the user. Instead, the intent detection application 213 can analyze a transcript 109 of the conversation between the chat bot 209 and the user to identify one or more intended actions 223. The intent detection application 213 can then extract any information from the transcript 109 necessary to complete the intended action 223 on behalf of the user. After gathering the necessary information, the intent detection application 213 can send a request to the workflow management system 216 to create a workflow item 239 corresponding to the intended action 223.

This separation of functionality between the chat bot 209 and the intent detection application 213 decouples the natural language processing of the chat bot 209 from the performance of actions to resolve a user's issue. Accordingly, refinements to the natural language processing abilities of the chat bot 209 (e.g., through adjustments to the recurrent neural network or improvements in the quality of the training data 236) would be less likely to impact the ability of the intent detection application 213 and the workflow management system 216 to identify and perform the tasks necessary to resolve a user's issue.

After creating the workflow item 239, the workflow management system 216 can begin processing the workflow item 239. This can include routing particular tasks to complete the workflow item 239 to specific individuals or systems, monitoring the progress of the workflow item 239 as individual tasks are completed, and other functions. In some instances, the workflow management system 216 can cause a notification to be sent to the client device 100 of the user when the workflow item 239 corresponding to the intended action 223 is completed.

Figure 3:
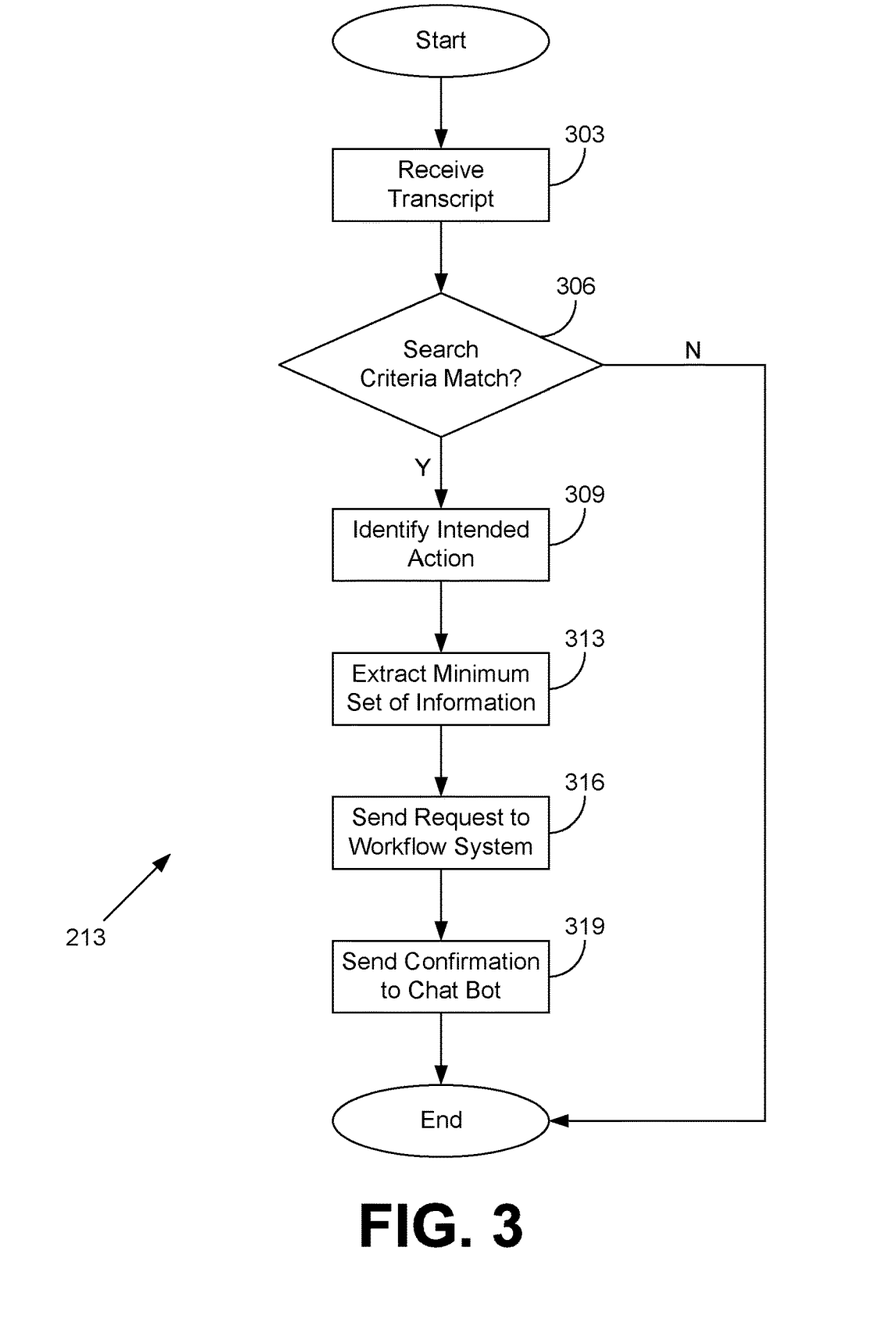
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the intent detection application 213 according to various embodiments. It is understood that the flowchart of FIG. 3 provides merely an example of the many different types of functional arrangements that may be employed to implement the operation of the portion of the intent detection application 213 as described herein. As an alternative, the flowchart of FIG. 3 may be viewed as depicting an example of elements of a method implemented in the computing environment 203 (FIG. 2) according to one or more embodiments.

Beginning with box 303, the intent detection application 213 receives a transcript 109. The transcript 109 can be received from multiple sources. Several examples are provided below.

In some instances, the chat bot 209 (FIG. 2) can provide the transcript 109 to the intent detection application 213. For example, after a conversation with a user is completed, the chat bot 209 could provide the transcript 109 to the intent detection application 213 in order to trigger any intended actions 223 identified in the transcript 109. As another example, the chat bot 209 can provide a real-time transcript 109 as the corresponding conversation occurs. In this example, the chat bot 209 could provide updates to the transcript 109 as the conversation evolves.

In other instances, the intent detection application 213 can retrieve individual transcripts 109 on its own. For example, the intent detection application 213 can periodically scan the data store 219 to identify new transcripts 109 saved to the data store 219. The intent detection application 213 can then retrieve and process the newly saved transcripts 109. These transcripts 109 could be saved, for example, by the chat bot 209 or from a chat program or messaging application used by a service agent.

Moving on to box 306, the intent detection application 213 checks to see whether one or more search criteria 229 (FIG. 2), such as a regular expression, match a string within the transcript 109. In some instances, the intent detection application 213 may check each of the search criteria 229 stored in the data store 219 (FIG. 2). In other instances, the intent detection application 213 may only check a subset of the search criteria 229. For example, the transcript 109 may be assigned to a category or type of service request (e.g., modify user account settings), so the intent detection application 213 may only check to see if a search criteria 229 linked to an intended action 223 (FIG. 2) related to changing a user account setting (e.g., reset password, change username, etc.) matches a string in the transcript 109. If none of the search criteria match, then the process ends. Otherwise the process continues to box 309.

Proceeding next to box 309, the intent detection application 213 identifies the intended action 223 of the service agent (e.g., the chat bot 209). For example, the intent detection application 213 can determine which intended action 223 is linked to the search criteria 229 that matched a string in the transcript 109.

Referring to box 313, the intent detection application 213 parses the transcript 109 to extract the minimum set of information necessary to complete the intended action 223 identified previously in box 309. As discussed above, the intended action 223 object will specify the minimum set of information necessary to complete the action, so the intent detection application 213 can determine what information to extract by querying or analyzing the intended action 223 object. The intent detection application 213 can then use various string or pattern matching approaches to identify the information in the transcript 109. However, in some implementations, this functionality may be provided instead by the entity extractor 214. In these implementations, the intent detection application 213 could specify to the entity extractor 214 the intended action 223. The entity extractor 214 could then use various string or pattern matching approaches to identify the information in the transcript 109 required to generate a workflow item 239 representing the intended action 223. The entity extractor 214 could then return the identified information to the intent detection application 213. In some other instances, however, the intent detection application 213 could instead send a request to the chat bot 209 to ask the user for the minimum set of information specified in the intended action 223 object and wait for the chat bot 209 to respond with the minimum set of information after receiving it from the user.

Moving to box 316, the intent detection application 213 sends a request to the workflow management system 216 to create a workflow item 239 corresponding to the identified intended action 223. The intent detection application 213 may include in the request the information extracted from the transcript in the preceding box so that the workflow item 239 can be created with all information necessary for the workflow item 239 to be processed. In some instances, the request from the intent detection application 213 to create the workflow item 239 will also cause the workflow management system 216 to begin processing the workflow item 239. In other instances, the intent detection application 213 may separately request that the workflow management system 216 begin processing the workflow item 239 after it is created.

Proceeding to box 319, the intent detection application 213 may then generate a confirmation that the workflow item 239 has been created and send the confirmation to the service agent (e.g., chat bot 209). The confirmation can include data that the service agent can relay or otherwise provide to the user. For example, if a refund will be issued on return of an item, the intent detection application 213 may provide a confirmation number to be used to track the status of the refund (e.g., check the progress of the workflow item 239) and a shipping label provided by the workflow management system 216 in response to processing a workflow item 239 for returning an item and issuing a refund. As another example, if an order is being changed, the intent detection application 213 may provide a confirmation number that identifies the workflow item 239 or similar information that can be used for future reference when discussing the modified order. Such a confirmation number, for example, may be issued by the workflow management system 216 and provided to the intent detection application 213 upon creation, processing, or completion of the corresponding workflow item 239, depending on the particular implementation.

Figure 4:
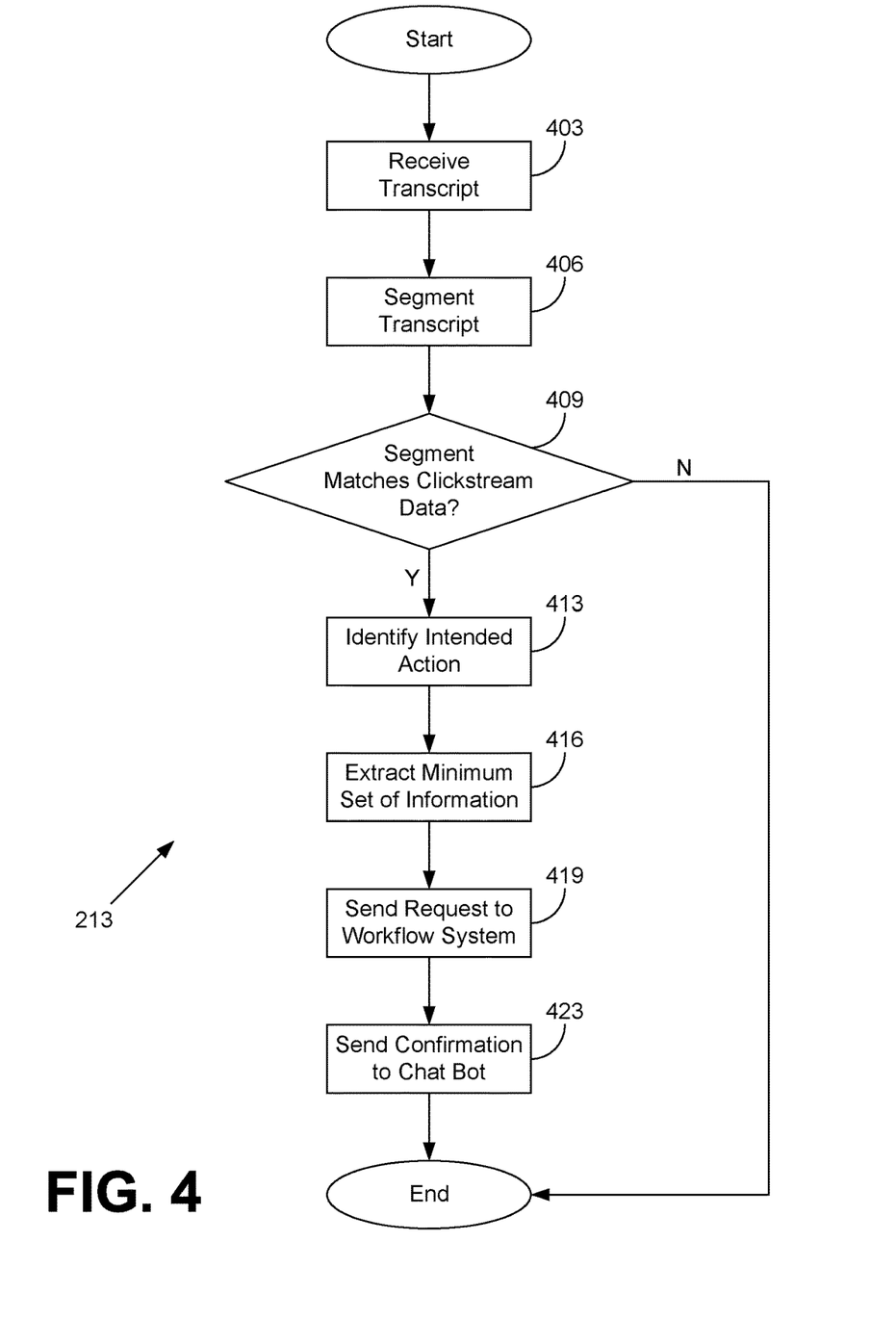
FIG. 4 is a flowchart illustrating one example of functionality implemented as portions of an application executed in a computing environment in the networked environment of FIG. 2 according to various embodiments of the present disclosure.

Referring next to FIG. 4, shown is a flowchart that provides one example of the operation of a portion of the intent detection application 213 according to various embodiments. It is understood that the flowchart of FIG. 4 provides merely an example of the many different types of functional arrangements that may be employed to implement the operation of the portion of the intent detection application 213 as described herein. As an alternative, the flowchart of FIG. 4 may be viewed as depicting an example of elements of a method implemented in the computing environment 203 (FIG. 2) according to one or more embodiments.

Beginning with box 403, the intent detection application 213 receives a transcript 109. The transcript 109 can be received from multiple sources. Several examples are provided below.

In some instances, the chat bot 209 (FIG. 2) can provide the transcript 109 to the intent detection application 213. For example, after a conversation with a user is completed, the chat bot 209 could provide the transcript 109 to the intent detection application 213 in order to trigger any intended actions 223 identified in the transcript 109. As another example, the chat bot 209 can provide a real-time transcript 109 as the corresponding conversation occurs. In this example, the chat bot 209 could provide updates to the transcript 109 as the conversation evolves.

In other instances, the intent detection application 213 can retrieve individual transcripts 109 on its own. For example, the intent detection application 213 can periodically scan the data store 219 to identify new transcripts 109 saved to the data store 219. The intent detection application 213 can then retrieve and process the newly saved transcripts 109. These transcripts 109 could be saved, for example, by the chat bot 209 or from a chat program or messaging application used by a service agent.

Moving on to box 406, the intent detection application 213 divides the transcript 109 into one or more segments. The segments may occur along various boundaries within the transcript 109. For example, each individual statement, request, or instruction from a user may be included in its own segment. Likewise, each individual statement, response, or instruction from the service agent (e.g., chat bot 209) may be included in its own segment. As another example, the transcript 109 may be divided into segments that correspond to individual words, phrases, sentences, or paragraphs.

Proceeding next to box 409, the intent detection application 213 whether any individual segment or combination of segments of the transcript 109 corresponds to a specific set of clickstream data 226 (FIG. 2). For example, the intent detection application 213 may determine whether one or more segments or combination of segments correspond to a particular set or sequence of mouse clicks, key strokes, or other user interactions recorded as clickstream data 226. In some embodiments, a random forest decision tree may be used to determine whether a segment matches a particular set of clickstream data 226. If no match is made, the process ends. Otherwise, the process continues to box 413.

Referring next to box 413, the intent detection application 213 identifies an intended action 223 to be triggered. For example, the intent detection application 213 determines that the particular set or sequence of mouse clicks, key strokes, or other user interactions recorded as clickstream data 226 that was previously identified in box 409 is linked to, corresponds to, or is associated with an intended action 223.

Moving on to box 416, the intent detection application 213 parses the transcript 109 to extract the minimum set of information necessary to complete the intended action 223 identified previously in box 413. As discussed above, the intended action 223 object will specify the minimum set of information necessary to complete the action, so that the intent detection application 213 can determine what information to extract by querying or analyzing the intended action 223 object. The intent detection application 213 can then use various string or pattern matching approaches to identify the information in the transcript 109. However, in some implementations, this functionality may be provided instead by the entity extractor 214. In these implementations, the intent detection application 213 could specify to the entity extractor 214 the intended action 223. The entity extractor 214 could then use various string or pattern matching approaches to identify the information in the transcript 109 required to generate a workflow item 239 representing the intended action 223. The entity extractor 214 could then return the identified information to the intent detection application 213. In some instances, however, the intent detection application 213 could instead send a request to the chat bot 209 to ask the user for the minimum set of information specified in the intended action 223 object and wait for the chat bot 209 to respond with the minimum set of information after receiving it from the user.

Proceeding to box 419, the intent detection application 213 sends a request to the workflow management system 216 to create a workflow item 239 corresponding to the identified intended action 223. The intent detection application 213 may include in the request the information extracted from the transcript in the preceding box so that the workflow item 239 can be created with all information necessary for the workflow item 239 to be processed. In some instances, the request from the intent detection application 213 to create the workflow item 239 will also cause the workflow management system 216 to begin processing the workflow item 239. In other instances, the intent detection application 213 may separately request that the workflow management system 216 begin processing the workflow item 239 after it is created.

Referring next to box 423, the intent detection application 213 the intent detection application 213 may then generate a confirmation that the workflow item 239 has been created and send the confirmation to the service agent (e.g., chat bot 209). The confirmation can include data that the service agent can relay or otherwise provide to the user. For example, if a refund will be issued on return of an item, the intent detection application 213 may provide a confirmation number to be used to track the status of the refund (e.g., check the progress of the workflow item 239) and a shipping label provided by the workflow management system 216 in response to processing a workflow item 239 for returning an item and issuing a refund. As another example, if an order is being changed, the intent detection application 213 may provide a confirmation number that identifies the workflow item 239 or similar information that can be used for future reference when discussing the modified order. Such a confirmation number, for example, may be issued by the workflow management system 216 and provided to the intent detection application 213 upon creation, processing, or completion of the corresponding workflow item 239, depending on the particular implementation.

Figure 5:
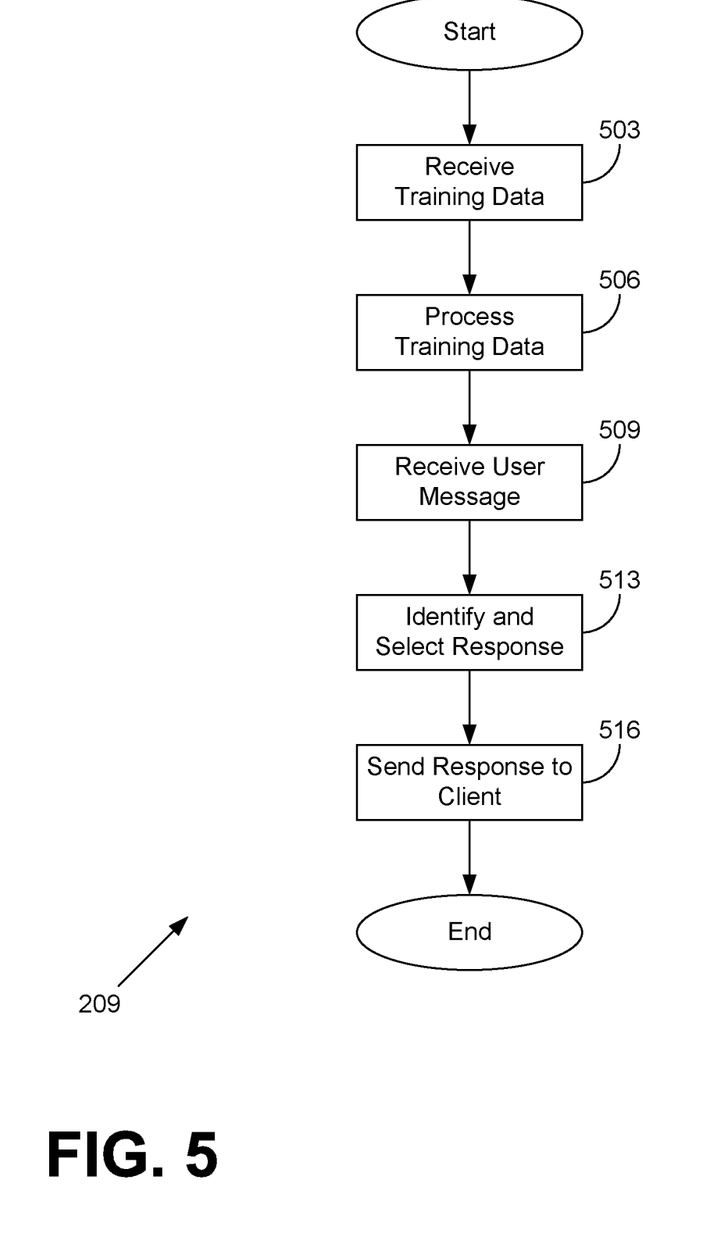
FIG. 5 is a flowchart illustrating one example of functionality implemented as portions of an application executed in a computing environment in the networked environment of FIG. 2 according to various embodiments of the present disclosure.

Referring next to FIG. 5, shown is a flowchart that provides one example of the operation of a portion of the chat bot 209 according to various embodiments. It is understood that the flowchart of FIG. 5 provides merely an example of the many different types of functional arrangements that may be employed to implement the operation of the portion of the chat bot 209 as described herein. As an alternative, the flowchart of FIG. 5 may be viewed as depicting an example of elements of a method implemented in the computing environment 203 (FIG. 2) according to one or more embodiments.

Beginning with box 503, the chat bot 209 receives training data 236. The training data 236 may be loaded into the chat bot 209 manually (e.g., as a file upload) or the chat bot 209 may be provided with the location of the training data 236 (e.g., in a database, a file, or a directory). In that instance, the chat bot 209 will retrieve and load the training data 236 from the location provided.

Moving to box 506, the chat bot 209 will process the training data 236 to identify particular user requests, queries, statements, instructions, or other messages and appropriate responses. For instance, the chat bot 209 will process the training data 236 with a recurrent neural network or similar machine learning approach. As the recurrent neural network processes the training data 236, the weight of individual connections between individual nodes (e.g., nodes representing a user message and nodes representing correct responses) will be modified. The greater the weight of a connection between two nodes in the recurrent neural network (e.g., a node representing a user message and a node representing a potential correct response), the more likely that a potential correct response is indeed the correct response for the user message.

Proceeding to box 509, the chat bot 209 receives a user message. The user message can be provided from various sources. For example, a user could type a message and submit the message to the chat bot 209 via a messaging application (e.g., email application, chat application, short message service (SMS) application, social media application, or similar application). As another example, a user could speak and have their words recorded with a microphone (e.g., a telephone, smartphone microphone, or other headless client device 100 with a microphone). Their words could be converted into text with a speech-to-text converter and then provided to the chat bot 209.

Referring next to box 513, the chat bot 209 identifies and selects a response to be provided to the user. For example, the chat bot 209 could find a node with its recurrent neural network that corresponds most closely to the received user message. The chat bot 209 could then identify which connection to a node representing a response has the greatest weight. The chat bot 209 could then select the response corresponding to the identified node in the recurrent neural network.

Moving to box 516, the chat bot 209 sends the selected response to the client device 100 of the user. In some instances, the chat bot 209 can cause a text message to be sent in reply (e.g., a reply email, a reply SMS message, a reply message within the same chat application, etc.). In other instances, the chat bot 209 can first send the response to a text-to-speech converter and send the converted audio data to the client device 100. For example, if a user were interacting with the chat bot 209 by speaking into a telephone, the user could hear the response through the speaker of the telephone. Similarly, if a user were using a headless client device 100, a speaker could render the response for the user to hear. After sending the response to the client device, the process ends.

Figure 6:
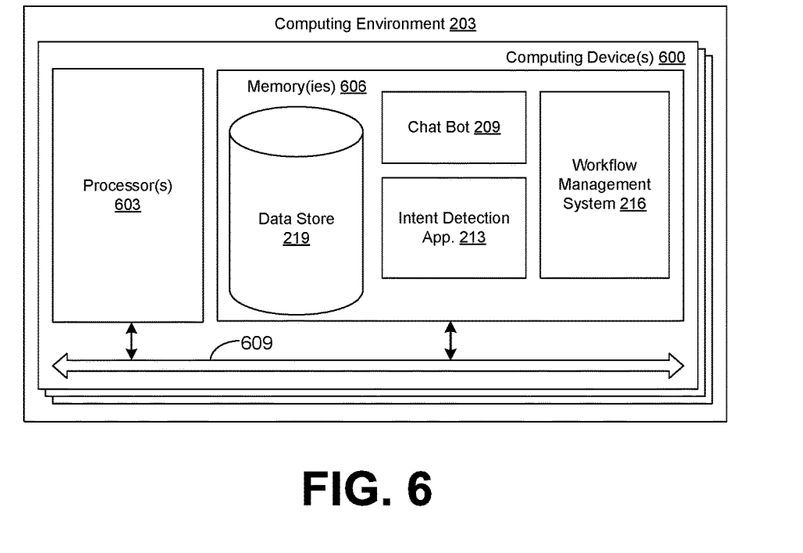
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 can include, for example, at least one server computer or like device. The local interface 609 can include, for example, a data bus with an accompanying address/control bus or other bus structure as can be appreciated.

Stored in the memory 606 are both data and several components that are executable by the processor 603. In particular, stored in the memory 606 and executable by the processor 603 are the chat bot 209, the intent detection application 213, the workflow management system 216, and potentially other applications. Also stored in the memory 606 may be a data store 219 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 can include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include, for example, static random access memory (SRAM), dynamic random access memory (DRAM), or magnetic random access memory (MRAM) and other such devices. The ROM can include, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 can include additional systems designed to coordinate this communication, including, for example, performing load balancing. The processor 603 may be of electrical or of some other available construction.

Although the chat bot 209, the intent detection application 213, the workflow management system 216, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4, and 5 show the functionality and operation of an implementation of portions of the intent detection application 213 and the chat bot 209, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the chat bot 209, the intent detection application 213, the workflow management system 216, that includes software or code can be embodied in any non-transitory computer-readable medium for use by or in connection with an instruction execution system such as, for example, a processor 603 in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the chat bot 209, the intent detection application 213, the workflow management system 216, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    an application comprising machine readable instructions stored in the memory that, when executed by the processor, cause the computing device to at least:
        receive a transcript of a conversation that represents an interaction between a chat bot and a customer, wherein a portion of the interaction between the chat bot and the customer is generated with a recurrent neural network integrated with the chat bot;
        determine that a portion of the transcript of the conversation between the chat bot and the customer matches a regular expression, wherein the regular expression is linked to an intended action to be performed by a service agent on behalf of the customer;
        determine that the portion of the transcript is associated with clickstream data related to the intended action, the clickstream data comprising a plurality of records of sequences of interactions with a set of user interface elements by the service agent to perform the intended action;
        extract from the transcript a minimum set of information required to create a workflow item corresponding to the intended action; and
        send a request to a workflow management system to create the workflow item corresponding to the intended action, wherein the request comprises the minimum set of information.

2. The system of claim 1, wherein the application further comprises machine readable instructions stored in the memory that, when executed by the processor, cause the computing device to at least send to the chat bot a recommended response for the chat bot to provide to the customer, wherein the recommended response is based at least in part on the intended action.

3. The system of claim 1, wherein the transcript is generated from an audio file that has been processed with a speech-to-text conversion system.

4. The system of claim 1, wherein the intended action comprises at least one of: a modification to an order, a cancellation of the order, or a cancellation of the user account.

5. A system, comprising:
    a computing device comprising a processor and a memory; and
    an application comprising machine readable instructions stored in the memory that, when executed by the processor, cause the computing device to at least:
        compare a transcript with clickstream data to identify an intended action of a service agent by matching a portion of the transcript to a regular expression, wherein:
            the transcript comprises a first set of text generated by the service agent and a second set of text generated by another party,
            the clickstream data comprises a plurality of records of sequences of interactions with a set of user interface elements by the service agent to perform the intended action on behalf of the other party, and
            wherein the regular expression is linked to the intended action of the service agent;
        in response to an identification of the intended action from the transcript, process the transcript to extract a minimum set of information required to create a workflow item that corresponds to the intended action; and
        send a request to a workflow management system to create the workflow item that corresponds to the intended action, wherein the request comprises an identifier for the intended action and the acquired information.

6. The system of claim 5, wherein the request to the workflow management system comprises a second request and the application further comprises machine readable instructions stored in the memory that, when executed by the processor, cause the computing device to at least:
    determine that the transcript fails to include the minimum set of information required to create the workflow item; and
    send a first request to the service agent to obtain a missing portion of the minimum set of information required to create the workflow item.

7. The system of claim 5, wherein the application further comprises machine readable instructions stored in the memory that, when executed by the processor, cause the computing device to at least perform a speech-to-text conversion on an audio stream to generate the transcript.

8. The system of claim 5, wherein the machine readable instructions that cause the computing device to at least process the transcript to identify the intended action of the service agent further comprise machine readable instructions that, when executed by the processor, cause the computing device to apply a random forest decision tree to the transcript to identify the intended action of the service agent.

9. The system of claim 5, wherein the application further comprises machine readable instructions stored in the memory that, when executed by the processor, cause the computing device to at least send to the service agent a recommended message for the service agent to provide to the user, wherein the recommended message is based at least in part on the intended action.

10. The system of claim 5, wherein the service agent comprises a chat bot and the first set of text is generated with a recurrent neural network trained with a plurality of transcripts.

11. The system of claim 5, wherein the intended action comprises a cancellation of an order.

12. The system of claim 5, wherein the intended action comprises a cancellation of a user account.

13. A method, comprising:
- identifying, with a computing device, a section of a transcript of a conversation between a service agent and a user;
- comparing, with the computing device the section of the transcript with clickstream data obtained from a plurality of interactions by the service agent with a service agent portal to determine that the section of the transcript corresponds to an intended action by the service agent on behalf of the user, the clickstream data comprising a plurality of records of sequences of interactions with a set of user interface elements of the service agent portal;
- determining that the section of the transcript matches a regular expression linked to the intended action;
- extracting, with the computing device, from the transcript a minimum set of information required to create the workflow item; and
- sending, with the computing device, a request to a workflow management system to create a workflow item that corresponds to the intended action, wherein the request to create the workflow item comprises the minimum set of information.

14. The method of claim 13, further comprising performing, with the computing device, a speech-to-text conversion on audio data to generate the transcript.

15. The method of claim 13, further comprising generating, with the computing device, a response for the service agent based at least in part on the intended action.

16. The method of claim 13, wherein the service agent comprises a chat bot that uses a recurrent neural network to generate a response to a query from the user, wherein the transcript includes the response to the query.

17. The method of claim 13, wherein the intended action comprises a modification to an order.

18. The method of claim 13, wherein the intended action comprises a cancellation of an order.

19. The method of claim 13, wherein the intended action comprises a cancellation of the user account.

* * * * *